(12) United States Patent
Koga et al.

(10) Patent No.: US 10,259,410 B2
(45) Date of Patent: Apr. 16, 2019

(54) BUMPER BEAM

(71) Applicant: NIPPON STEEL & SUMITOMO METAL CORPORATION, Tokyo (JP)

(72) Inventors: Atsuo Koga, Amagasaki (JP); Yoshiaki Nakazawa, Takarazuka (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 0 days.

(21) Appl. No.: 15/543,313

(22) PCT Filed: Jan. 19, 2016

(86) PCT No.: PCT/JP2016/000257
§ 371 (c)(1),
(2) Date: Jul. 13, 2017

(87) PCT Pub. No.: WO2016/117335
PCT Pub. Date: Jul. 28, 2016

(65) Prior Publication Data
US 2018/0001853 A1 Jan. 4, 2018

(30) Foreign Application Priority Data
Jan. 21, 2015 (JP) .................................. 2015-009105

(51) Int. Cl.
*B60R 19/03* (2006.01)
*B60R 19/04* (2006.01)
*B60R 19/18* (2006.01)

(52) U.S. Cl.
CPC .............. *B60R 19/03* (2013.01); *B60R 19/04* (2013.01); *B60R 19/18* (2013.01); *B60R 2019/1813* (2013.01)

(58) Field of Classification Search
CPC ............ B60R 19/18; B60R 2019/1813; B60R 19/023; B60R 19/24; B60R 2019/1826; B60R 2019/182; B60R 19/34
(Continued)

(56) References Cited

U.S. PATENT DOCUMENTS 7,354,030 B2 * 4/2008 Murayama .............. B60R 19/18
267/140
7,490,877 B2 * 2/2009 Asahi ...................... B60R 19/18
293/155
(Continued)

FOREIGN PATENT DOCUMENTS

JP 06-171441 6/1994
JP 06-328988 11/1994
(Continued)

*Primary Examiner* — D Glenn Dayoan
*Assistant Examiner* — Sunsurraye Westbrook
(74) *Attorney, Agent, or Firm* — Clark & Brody

(57) ABSTRACT

A bumper beam includes a first member, a second member, and an inner plate. The first member includes a top plate section, two vertical wall sections, and two flange sections. The two flange sections connect to the two vertical wall sections, respectively. The second member is plate-shaped, is joined to the two flange sections of the first member, and doses the gap between the two flange sections at least. The inner plate is joined to the two vertical wall sections of the first member and is disposed substantially in parallel with the second member in a space formed by the first member and the second member. Out of the first member and the second member, the second member is disposed facing the outside of a vehicle. Such a bumper beam has high energy absorption efficiency.

10 Claims, 10 Drawing Sheets

(58) Field of Classification Search
USPC ....... 293/102, 117, 120, 132, 155, 133, 121,
293/115, 4; 72/176, 203, 177, 339, 352,
72/365.2, 379.2; 296/205, 209, 70, 1.08,
296/198, 187.07
See application file for complete search history.

(56) References Cited

U.S. PATENT DOCUMENTS

| | | | | |
|---|---|---|---|---|
| 8,177,044 | B2* | 5/2012 | Murayama | .............. B60R 19/18 |
| | | | | 188/371 |
| 2005/0213478 | A1 | 9/2005 | Glasgow et al. | |
| 2012/0126553 | A1* | 5/2012 | Mildner | .................. B60R 19/04 |
| | | | | 293/102 |

FOREIGN PATENT DOCUMENTS

| | | |
|---|---|---|
| JP | 07-309184 | 11/1995 |
| JP | 2010-023658 | 2/2010 |

* cited by examiner

BUMPER BEAM

TECHNICAL FIELD

The present invention relates to a bumper beam for a vehicle. More specifically, it relates to a bumper beam for an automobile.

BACKGROUND ART

A bumper beam is provided inside of a bumper of a vehicle. This is to allow the bumper beam to bear an impact load upon collision, thereby ensuring safety of the vehicle. In particular, large energy is generated upon frontal collision in an automobile or the like. On the other hand, in recent years, from the viewpoint of reducing $CO_2$ and improving fuel economy, there is a demand for weight reduction of a bumper beam. To realize weight reduction of a bumper beam, it is necessary to improve strength of the bumper beam while reducing the plate thickness of the bumper beam.

To enhance the strength of a bumper beam, a bumper beam reinforced by a reinforcing member has been proposed (for example, Japanese Patent Application Publication No. 7-309184 (Patent Literature 1), Japanese Patent Application Publication No. 6-328988 (Patent Literature 2), and Japanese Patent Application Publication No. 6-171441 (Patent Literature 3)).

In a bumper beam disclosed by Patent Literature 1, a reinforcing member is disposed in a box-shaped space formed by multiple joined members. The reinforcing member lies in a fore-and-aft direction of vehicle. Patent Literature 1 states that it is thereby possible to achieve an equivalent strength of the bumper beam compared with that of a conventional bumper beam, as well as to realize weight reduction and cost reduction.

A bumper beam disclosed in Patent Literature 2 has a box-shaped cross section, and a reinforcing member inside of the box-shaped cross section. The reinforcing member lies in the up-and-down direction of a vehicle. Therefore, when a load is applied in the fore-and-aft direction of the vehicle, outward deformation of an upper wall section and a lower wall section is suppressed. Patent Literature 2 states that this enhances the strength of the bumper beam.

A bumper beam disclosed in Patent Literature 3 has a box-shaped cross section formed by combining hat-shaped press formed parts, and has a reinforcing member in its internal space. The reinforcing member lies in the up-and-down direction of the vehicle. Patent Literature 3 states that this will enhance the strength of the bumper beam, and suppress deformation of the bumper beam.

CITATION LIST

Patent Literature

Patent Literature 1: Japanese Patent Application Publication No. 7-309184
Patent Literature 2: Japanese Patent Application Publication No. 6-328988
Patent Literature 3: Japanese Patent Application Publication No. 6-171441

SUMMARY OF INVENTION

Technical Problem

However, in the bumper beam of Patent Literature 1, the reinforcing member is disposed in the fore-and-aft direction of the vehicle in a cross section seen from the lateral side of the vehicle. For that reason, when an impact load is applied to a bumper beam, it is difficult for the reinforcing member to suppress buckling of the upper and lower wall sections. Therefore, it is difficult to further increase the strength of the bumper beam.

In the bumper beam of Patent Literatures 2 and 3, since the reinforcing member is disposed along the up-and-down direction of the vehicle in a cross section seen from the lateral side of the vehicle, deformation of upper and lower wall sections is suppressed. As a result, an effect of suppressing buckling of wall sections can be expected. However, since the surface which receives an impact load is prone to deformation, improvement in energy absorption efficiency of the bumper beam is limited.

An objective of the present invention is to provide a bumper beam for a vehicle which has a high energy absorption efficiency.

Solution to Problem

A bumper beam according to an embodiment of the present invention comprises a first member, a second member, an inner plate. The first member includes a top plate section, two vertical wall sections, and two flange sections. The two vertical wall sections respectively connect to both side sections of the top plate section. The two flange sections respectively connect to the two vertical wall sections. The second member is plate-shaped, is joined to the two flange sections of the first member, and closes a gap between the two flange sections at least. The inner plate is joined to the two vertical wall sections of the first member, and is disposed substantially in parallel with the second member in a space formed by the first member and the second member. The second member out of the first member and the second member is disposed facing the outside of the vehicle.

Advantageous Effects of Invention

The bumper beam according to the present invention is a bumper beam for a vehicle, which exhibits a high energy absorption efficiency.

DESCRIPTION OF EMBODIMENTS

Figure 1:
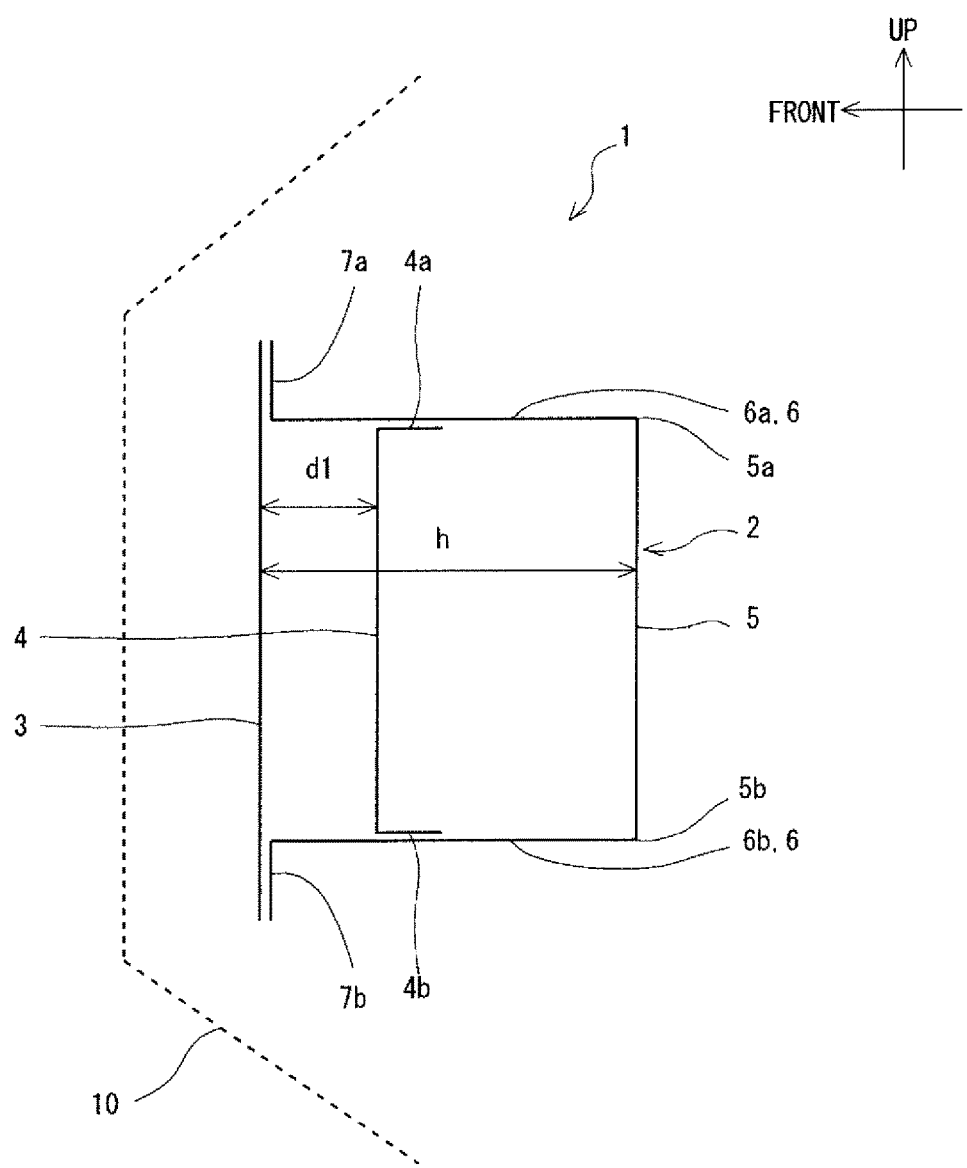
FIG. 1 is a cross sectional view of a bumper beam of a first embodiment.

A bumper beam according to the present embodiment comprises a first member, a second member, and an inner plate. The first member includes a top plate section, two vertical wall sections, and two flange sections. The two vertical wall sections respectively connect to both side sections of the top plate section. The two flange sections respectively connect to the two vertical wall sections. The second member is plate-shaped, is joined to the two flange sections of the first member, and closes a gap between the two flange sections at least. The inner plate is joined to the two vertical wall sections of the first member, and is disposed substantially in parallel with the second member in a space formed by the first member and the second member. The second member out of the first member and the second member is disposed facing the outside of the vehicle.

This will increase a maximum load which is permitted by the bumper beam, and delays a timing of buckling occurrence. Therefore, the energy absorption efficiency of the bumper beam increases. Here, the maximum load which is permitted by the bumper beam (hereinafter, referred to as a "maximum permissible load") refers to a load being applied to the bumper beam when the vertical wall sections of the bumper beam buckle. Here, the energy absorption efficiency is a value obtained by dividing the energy absorbed by the bumper beam when an impact load is applied by a mass of the bumper beam.

To sufficiently improve the energy absorption efficiency, it is preferable that a ratio $d1/h$ is not less than 0 and not more than 0.6, where $h$ is an interval between the second member and the top plate section of the first member, and $d1$ is an interval between the second member and the inner plate. More preferably, a ratio $d1/h$ is not less than 0 and not more than 0.2, where $h$ is the interval between the second member and the top plate section of the first member, and $d1$ is the interval between the second member and the inner plate. Note that the interval $h$ corresponds to a depth from the second member to the top plate section of the first member. The interval $d1$ corresponds to a depth from the second member to the inner plate.

When an impact load is applied to the second member which is disposed outside of the vehicle in the above described bumper beam, a force in a tensile direction occurs in the top plate section of the first member which is disposed inside of the vehicle. For this reason, cracking or breakage may occur in the top plate section. To cope with such a situation, it is preferable that the inner plate is disposed at least partially in a region at a distance of not less than $-0.2 \times L$ and not more than $0.2 \times L$ from a center in a lengthwise direction of the bumper beam, where $L$ is an overall length of the bumper beam. More preferably, the inner plate is disposed at least partially in a region at a distance of not less than $-0.1 \times L$ and not more than $0.1 \times L$ from a center in the lengthwise direction of the bumper beam. As a result, the vertical wall section buckles before cracking occurs in the top plate section, and therefore the bumper beam is not likely to break off. As a result, it is possible to suppress significant deterioration of energy absorption efficiency due to breakage of the bumper beam.

In the above described bumper beam, it is preferable that the first member and the inner plate are made of a metal plate, and a ratio $t2/t1$ is not less than 0.7 and not more than 1.0, where $t1$ is a plate thickness of the first member, and $t2$ is a plate thickness of the inner plate. Moreover, it is preferable that a ratio $TS2/TS1$ is not less than 0.4 and not more than 1.0, where $TS1$ is a tensile strength of the first member, and $TS2$ is a tensile strength of the inner plate.

In such a case, since the strength of the inner plate is lower than that of the first member, the vertical wall section buckles before cracking occurs in the top plate section when a concentrated load is applied to a center in the lengthwise direction of the bumper beam, and therefore it is possible to further suppress significant deterioration of energy absorption efficiency due to breakage of the bumper beam.

Preferably, the inner plate and the vertical wall sections are joined by welding. It is particularly preferable that end sections of the inner plate are bent, and each bent end section and the vertical wall section are superposed and joined. In this case, when the end sections of the inner plate are bent toward the first member, the inner plate becomes more likely to deflect toward the second member.

Preferably, the first member and the second member are made of a steel plate, and the tensile strength of the steel plate is not less than 1 GPa. As a result, a bumper beam suitable for an automobile will be obtained.

The above described bumper beam is applied to a vehicle. In this case, the vehicle is mounted with the above described bumper beam in the front or rear of the vehicle. The second member of the bumper beam is disposed facing the outside of the vehicle.

Hereinafter, referring to the drawings, embodiments of the present invention will be described in detail. Like or corresponding parts are given like symbols throughout the drawings, and description thereof will not be repeated. Moreover, hereinafter as an example, a case in which the bumper beam of the present embodiment is applied to a front bumper of an automobile will be described.

[First Embodiment]

FIG. 1 is a cross sectional view of a bumper beam 1 of a first embodiment. In FIG. 1, the character "up" means upward of a vehicle, and a character "front" refers to forward of the vehicle. The same applies to the following figures. Referring to FIG. 1, the bumper beam 1 is disposed inside of a bumper 10 of a vehicle. The bumper beam 1 includes a first member 2, a second member 3, and an inner plate 4. The bumper beam 1 of the first embodiment has a cross-sectional shape as shown in FIG. 1, and extends in a width direction of the vehicle.

The first member 2 includes a top plate section 5, vertical wall sections 6a, 6b, and flange sections 7a, 7b. One end of each of the two vertical wall sections 6a, 6b connects to each of both side sections 5a, 5b of the top plate section 5. The other ends of the vertical wall sections 6a, 6b connect to respective flange sections 7a, 7b. The cross-sectional shape of the first member 2 is a hat-shaped open cross-section. In other words, a gap between the two flange sections 7a, 7b is opened. The first member 2 is formed, for example, by press-forming a metal plate.

The second member 3 is a plate-shaped member, and is formed, for example, by stamp-forming a metal plate. A joint section is provided between the second member 3 and the first member 2. Specifically, the second member 3 is joined to the flange sections 7a, 7b of the first member 2 to close the gap between the flange sections 7a and 7b. In other words, the first member 2 and second member 3 joined to each other form a closed cross-section.

The inner plate 4 is disposed substantially in parallel with the second member 3 in a space formed by the first member 2 and the second member 3. A joint section is provided between the inner plate 4 and the first member 2. Specifically, end sections 4a, 4b of the inner plate 4 are bent at substantially right angle and are respectively joined to upper and lower vertical wall sections 6a, 6b. The end sections 4a, 4b of the inner plate 4 are disposed facing the top plate section 5. The inner plate 4 is formed, for example, by press-molding a metal plate. Such inner plate 4 restricts deformation of the vertical wall sections 6a, 6b. For that reason, the vertical wall sections 6a, 6b are not likely to buckle. The inner plate 4 does not need to be strictly parallel with the second member 3, and permits a certain inclination. This inclination is, for example, not more than 10°.

The inner plate 4 may be added with a bead along the vehicle up-and-down direction, and subjected to emboss processing. Since such processing improves the rigidity of the inner plate, the inner plate 4 further restricts deformation of the vertical wall sections 6a, 6b. As a result, the vertical wall sections 6a, 6b become less likely to buckle, and improvement in energy absorption efficiency can be expected.

Such bumper beam 1 is disposed with the second member 3 facing the outside of the vehicle. For example, when the bumper beam 1 is applied as the bumper beam for a front bumper of a vehicle, the second member 3 is disposed facing forward of the vehicle. In a state in which the bumper beam 1 is disposed in the vehicle, the top plate section 5 of the first member 2, the second member 3, and the inner plate 4 come into an upright position in the vehicle up-and-down direction. The vertical wall sections 6a, 6b of the first member 2 come into a position to extend along the vehicle fore-and-aft direction at upper and lower locations respectively. As a result, the bumper beam 1 has a high energy absorption efficiency for impact in the fore-and-aft direction. Hereafter, this point will be described in detail.

Upon disposing the bumper beam 1 in a vehicle, two kinds of disposition patterns are conceivable. One is a case in which the second member 3 is disposed facing the outside of the vehicle (hereinafter, referred to as Case 1) as shown in FIG. 1. The second is a case in which the top plate section 5 of the first member 2 is disposed facing the outside of the vehicle as described in Patent Literatures 2 and 3 (hereinafter, referred to as Case 2). The present inventors have investigated energy absorption efficiency on Case 1 and Case 2 by a dynamic 3-point bending simulation analysis to grasp basic characteristics of the bumper beam.

Figure 2A:
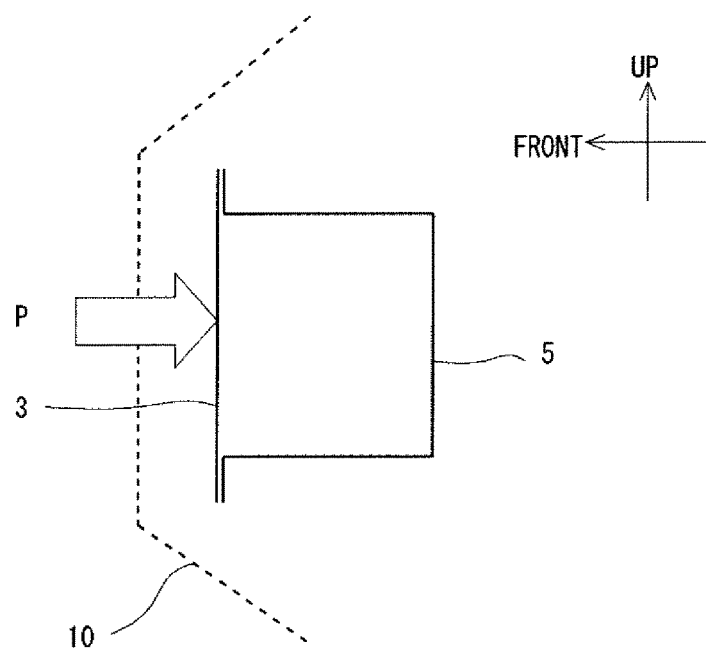
FIG. 2A is a cross sectional view of a bumper beam of Case 1.
Figure 2B:
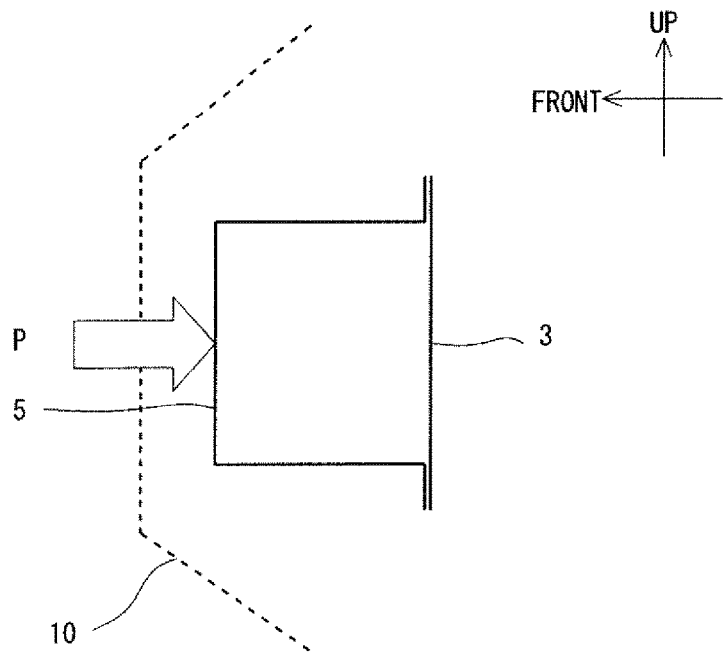
FIG. 2B is a cross sectional view of a bumper beam of Case 2.

FIGS. 2A and 2B show a cross-sectional view of a model of the bumper beam, which was used in the dynamic 3-point bending simulation analysis. Out of these figures, FIG. 2A shows a case of the bumper beam of Case 1, and FIG. 2B shows a case of the bumper beam of Case 2. There was no inner plate 4 in the models of Case 1 and Case 2. Referring to FIG. 2A, a load P in a direction toward the top plate section 5 was applied over the entire area in the up-and-down direction to a center in the lengthwise direction of the second member 3 in Case 1. Referring to FIG. 2B, a load P in a direction toward the second member 3 was applied over the entire area in the up-and-down direction to a center in the lengthwise direction of the top plate section 5 in Case 2. Then, deformation behavior of the bumper beam was analyzed. In that occasion, relationship between the load P and the deflection was investigated on each bumper beam. Here, the deflection refers to a deflection of a portion to which load P was applied. In the dynamic 3-point bending simulation analysis, the load application speed was 9 km/h, and an inter-fulcrum distance was 800 mm. Analysis results thereof are shown in FIGS. 3A to 3C, and FIG. 4.

Figure 3A:
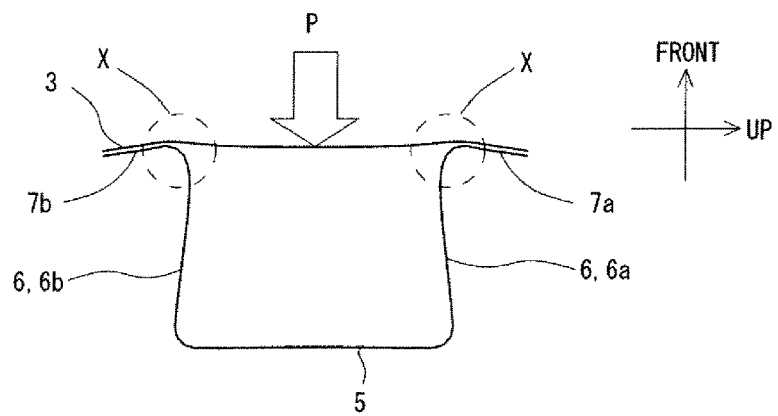
FIG. 3A is a diagram to show deformation behavior of the bumper beam of Case 1, the diagram showing an initial state.
Figure 3B:
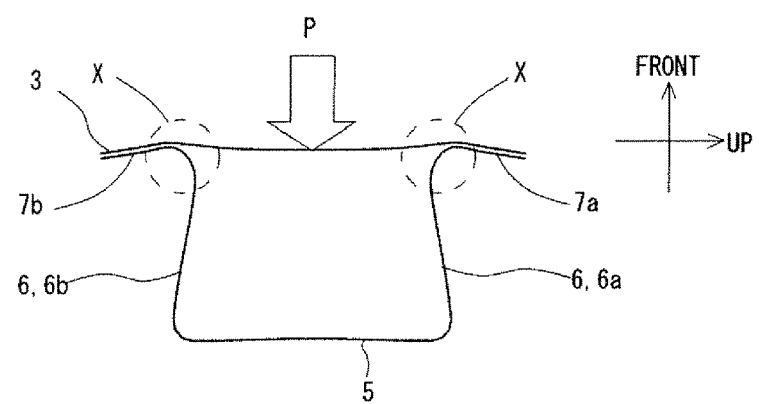
FIG. 3B is a diagram to show a state which has progressed from the state shown in FIG. 3A.
Figure 3C:
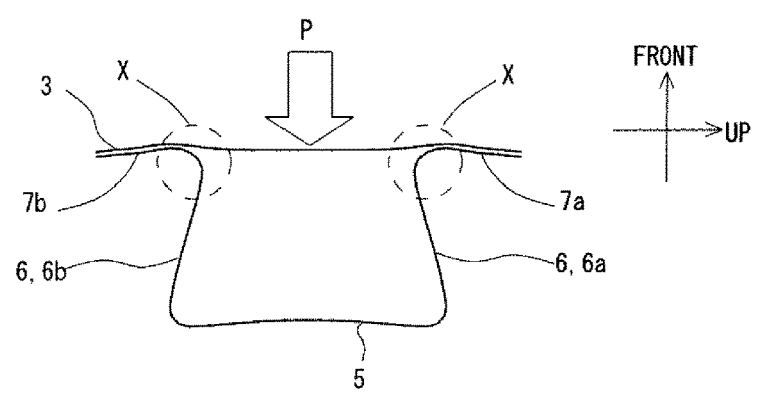
FIG. 3C is a diagram to show a state which has progressed from the state shown in FIG. 3B.

FIGS. 3A to 3C show a diagram to show deformation behavior of the bumper beam of Case 1. The deformation of the bumper beam progresses in the order shown in FIGS. 3A, 3B and 3C. Referring to FIGS. 3A to 3C, upon application of load P to the second member 3, compressive force acts along the lengthwise direction of the bumper beam on the vicinity of end sections X of the vertical wall sections 6a, 6b (hereinafter, also referred to generically as a vertical wall section 6). Here, the compressive force is force which tends to cause each of the two vertical wall sections 6 to contact in the lengthwise direction of the bumper beam. Due to the action of such compressive force, the end section X on the second member 3 side of the vertical wall section 6 moves toward the center in the vehicle up-and-down direction. As a result, the vertical wall section 6 deforms, and eventually buckles.

Figure 4:
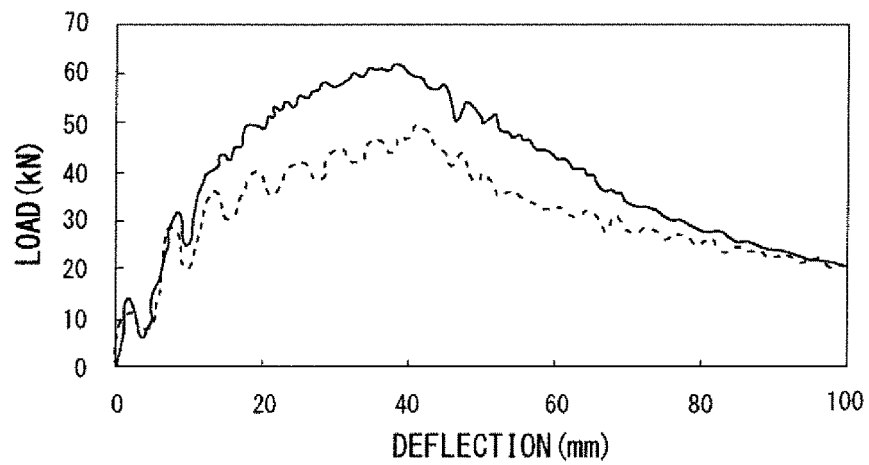
FIG. 4 is load-deflection diagrams of Case 1 and Case 2.

FIG. 4 is a load-deflection diagram relating to the bumper beams of Case 1 and Case 2. The ordinate indicates the load, and the abscissa indicates the deflection. In FIG. 4, the solid line indicates the result of the bumper beam of Case 1, and the broken line indicates the result of the bumper beam of Case 2. The load-deflection diagram shown in FIG. 4 reveals the followings. In Case 1, the load becomes maximum when the deflection is about 38 mm. The maximum load is about 62 kN. When the deflection becomes about not less than 38 mm, the vertical wall section 6 buckles. In Case 2, when the deflection is about 42 mm, the load becomes maximum. The maximum load is about 50 kN. When the deflection becomes not less than about 42 mm, the vertical wall section 6 buckles. It is seen from this that the maximum permissible load of Case 1 is larger than that of Case 2. However, the deflection until leading to buckling is smaller in Case 1 than in Case 2. In other words, the timing of buckling occurrence is earlier in Case 1 than in Case 2.

The energy absorbed by a bumper beam equals to an integrated value of the load-deflection curve of FIG. 4. Therefore, to increase the energy absorption efficiency of a bumper beam, it is effective to increase the maximum permissible load, and to delay the timing of buckling occurrence. From the view point of structure, the bumper beam of Case 1 has a higher maximum permissible load than that of Case 2. Accordingly, the present inventors studied on how to delay the timing of buckling occurrence, thereby improving the energy absorption efficiency regarding the bumper beam of Case 1.

In the bumper beam of Case 1, as shown in FIGS. 3A to 3C, since end sections X move toward a center in the vehicle up-and-down direction of the bumper beam in an early stage due to compressive force acting on the vertical wall section 6, the vertical wall section 6 deforms and buckles. In other words, if the movement of the end section X is suppressed, it is possible to suppress the vertical wall section 6 from buckling in an early stage. Accordingly, as shown in FIG. 1, the bumper beam 1 of the present embodiment is disposed with an inner plate 4 substantially in parallel with the second member 3 in a space formed by the first member 2 and the second member 3. The end sections 4a, 4b of the inner plate 4 are respectively joined to the upper and lower vertical wall sections 6a, 6b. The inner plate 4 suppresses deformation of the vertical wall section 6. Therefore, even if the end section X moves, the vertical wall section 6 is not likely to deform. In other words, the vertical wall section 6 is less likely to buckle. As a result, the timing of buckling occurrence of the bumper beam 1 is delayed. Moreover, since the bumper beam 1 is disposed with the second member 3 facing the outside of the vehicle, the maximum permissible load of the bumper beam 1 is high as in Case 1. In short, since adding the inner plate 4 to the bumper beam of Case 1, which has a high maximum permissible load, suppresses buckling of the vertical wall section 6, the timing of buckling occurrence of the vertical wall section 6 is late. As a result, the energy absorption efficiency of the bumper beam 1 will be improved.

The position of the inner plate 4 is preferably closer to the second member 3. Specifically, referring to FIG. 1, a ratio d1/h relating to the inner plate 4 is preferably not less than 0 and not more than 0.6. Here, h indicates an interval between the second member 3 and the top plate section 5 of the first member 2, and d1 indicates an interval between the second member 3 and the inner plate 4. This point will be described referring to FIG. 5.

Figure 5:
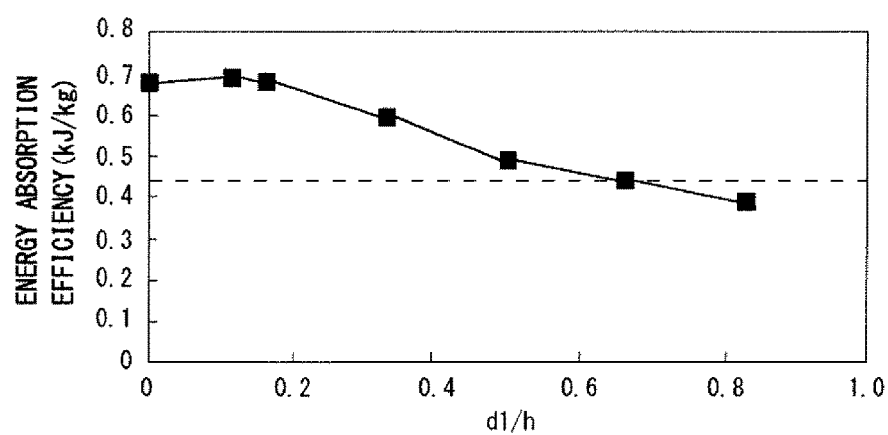
FIG. 5 is a diagram to show relationship between the position of an inner plate and energy absorption efficiency.
Figure 6A:
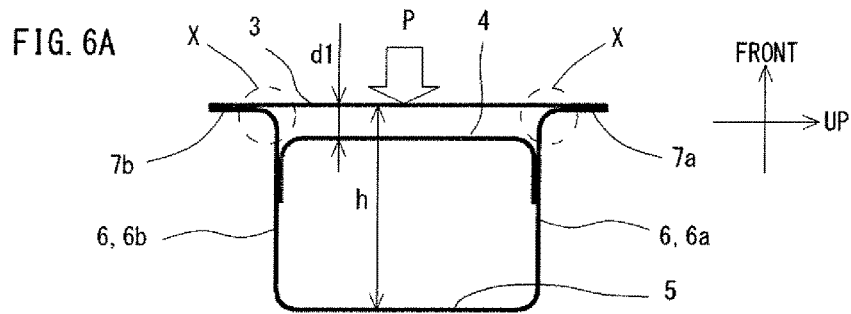
FIG. 6A is a diagram to show deformation behavior of a bumper beam of a first embodiment, the diagram showing an initial state.
Figure 6B:
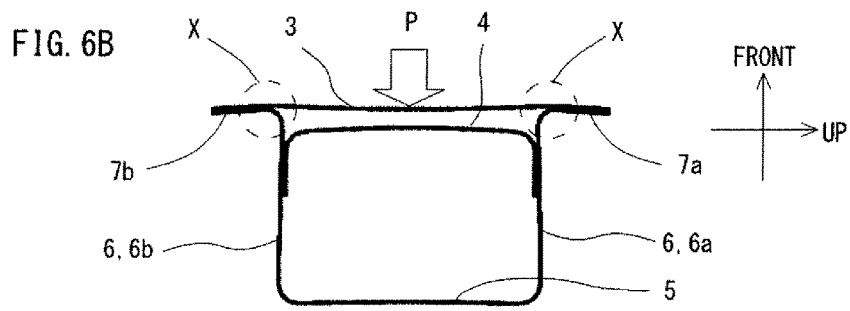
FIG. 6B is a diagram to show a state which has progressed from the state shown in FIG. 6A.
Figure 6C:
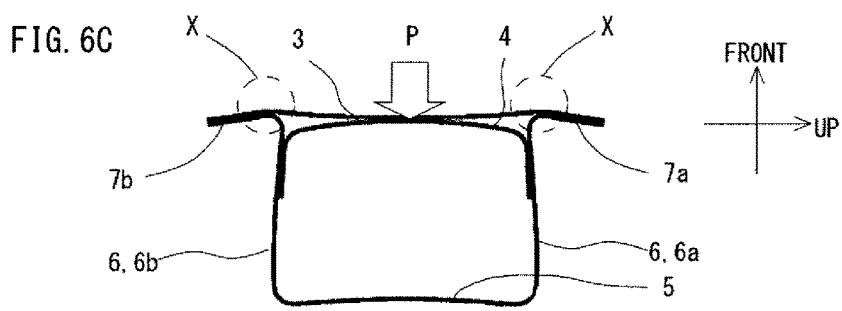
FIG. 6C is a diagram to show a state which has progressed from the state shown in FIG. 6B.
Figure 6D:
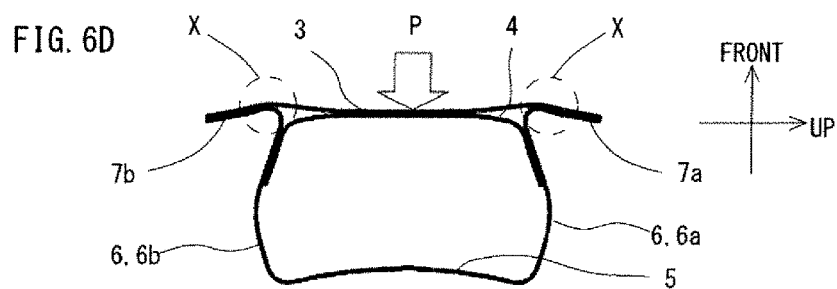
FIG. 6D is a diagram to show a state which has progressed from the state shown in FIG. 6C.
Figure 7A:
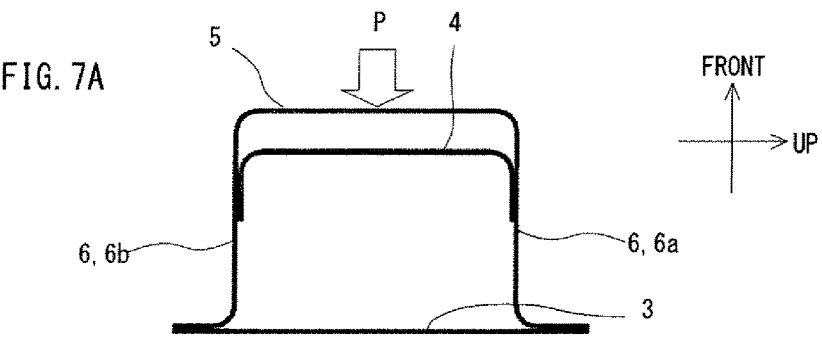
FIG. 7A is a diagram to show deformation behavior of a bumper beam of Case 2 in which an inner plate is added, the diagram showing an initial state.
Figure 7B:
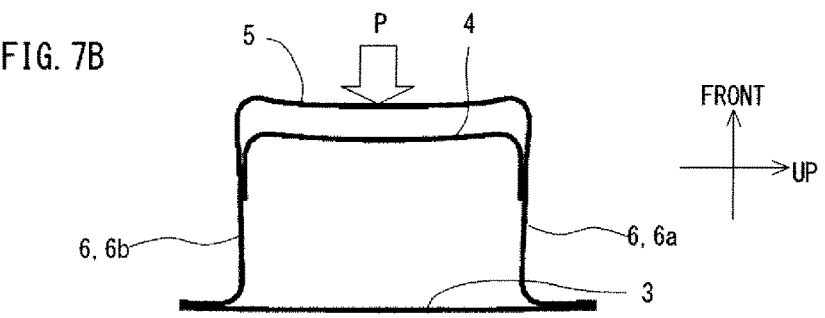
FIG. 7B is a diagram to show a state which has progressed from the state shown in FIG. 7A.
Figure 7C:
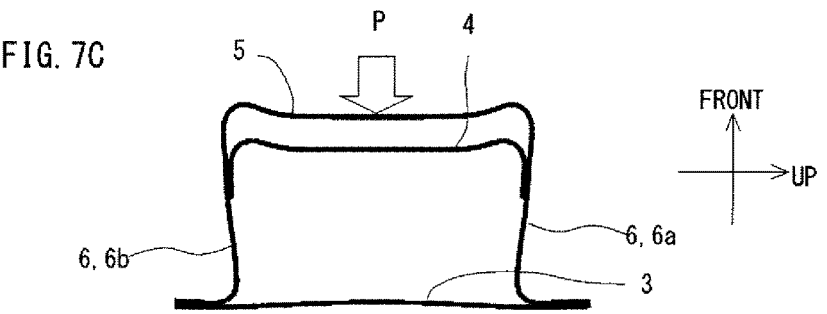
FIG. 7C is a diagram to show a state which has progressed from the state shown in FIG. 7B.
Figure 7D:
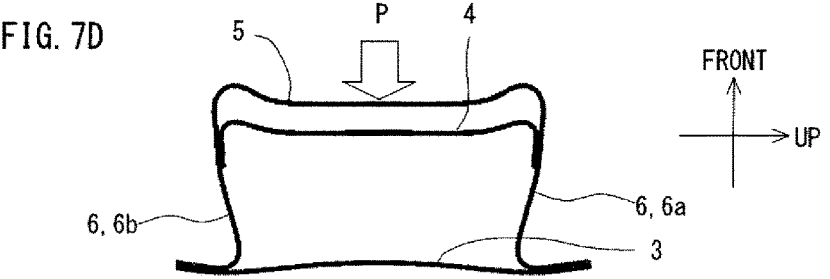
FIG. 7D is a diagram to show a state which has progressed from the state shown in FIG. 7C.

FIG. 5 is a diagram to show the energy absorption efficiency of bumper beams having a different ratio d1/h, which relates to the position of the inner plate 4. The results shown in FIG. 5 were obtained by a similar dynamic 3-point bending simulation analysis as described above. Simulation analysis was conducted on each bumper beam in which the ratio d1/h, which relates to the position of the inner plate 4 of the bumper beam shown in FIG. 1, was widely varied. Other analysis conditions were the same as those for the simulation analysis shown in FIGS. 3A to 3C, and FIG. 4 described above. Referring to FIG. 5, the energy absorption efficiency exhibited a maximum value at a ratio d1/h of about 0.16. As the ratio d1/h increased more than 0.16, the energy absorption efficiency deteriorated. The energy absorption efficiency of a bumper beam without the inner plate 4 was 0.44 kJ/kg (see the broken line in FIG. 5). When the ratio d1/h is more than 0.65, the energy absorption efficiency of a bumper beam having the inner plate 4 becomes less than the energy absorption efficiency of a bumper beam without the inner plate 4. Therefore, the inner plate 4 is preferably disposed at a position in which the ratio d1/h relating to the inner plate 4 is not less than 0 and not more than 0.6.

Further, when the ratio d1/h relating to the position of the inner plate 4 is not more than 0.2, the inner plate 4 and the second member 3 are brought into contact with each other in an early stage during application of load. For that reason, the deflection of the second member 3 is limited, and thereby the movement of the end section X of the vertical wall section 6 shown in FIG. 3A is limited. Therefore, the vertical wall section 6 is less likely to buckle. To confirm this effect, the present inventors studied on the deformation behavior of a bumper beam whose ratio d1/h is 0.16 by means of the dynamic 3-point bending simulation analysis. The analysis conditions were the same as those of the simulation analysis shown in FIGS. 3A to 3C, and FIG. 4 as described above. The analysis results are shown in FIGS. 6A to 6D.

FIGS. 6A to 6D are diagrams to show deformation behavior of a bumper beam of the first embodiment. The deformation of a bumper beam whose ratio d1/h is 0.16 proceeds in the order shown in FIG. 6A, FIG. 6B, FIG. 6C, and FIG. 6D. Referring to FIGS. 6A to 6D, since compressive force acts on the vertical wall section 6 upon application of load P to the second member 3, the end section X of the vertical wall section 6 moves toward a center in the vehicle up-and-down direction of the bumper beam as described above. Since the inner plate 4 is joined to the vertical wall section 6, it is compressed as the end section X moves. At this moment, the inner plate 4 deflects toward the second member 3 side. Therefore, the second member 3 and the inner plate 4 come into contact with each other. Since the deflection of the second member 3 is limited by the inner plate 4 upon contact of the inner plate 4 with the second member 3, movement of the end section X of the vertical wall section 6 is limited as well. As a result of that, the buckling of the vertical wall section 6 is further suppressed. In other words, when the ratio d1/h is not more than 0.2, not only the buckling of the vertical wall section 6 is suppressed by the inner plate 4, but also effect by the contact between the inner plate 4 and the second member 3 as described above is added. Therefore, the maximum permissible load of the bumper beam 1 further increases.

Where, when the ratio d1/h is 0, the inner plate 4 is in contact with the second member 3 before the load P is applied. In this case, the modes of deformation of the second member 3 and the inner plate 4 are different. In other words, the second member 3 and the inner plate 4 deform in an integral manner. For that reason, the energy absorption efficiency deteriorates compared with when the ratio d1/h is 0.16. Therefore, a preferable lower limit of the ratio d1/h is 0.1. However, the energy absorption efficiency of a bumper beam when the ratio d1/h is 0 is higher than the energy absorption efficiency of a bumper beam without the inner plate 4. For that reason, the ratio d1/h may be 0.

To bring the inner plate 4 into contact with the second member 3 upon application of load, it is necessary to dispose the second member 3 facing the outside of the vehicle as in Case 1 shown in FIG. 2A. In other words, when the top plate section 5 of the first member 2 is disposed facing the outside of the vehicle as in Case 2 shown in FIG. 2B, the second member 3 is not likely to contact with the inner plate 4. Regarding this point, the present inventors studied the deformation behavior of a bumper beam of Case 2 in which an inner plate is added by means of the dynamic 3-point bending simulation analysis. The analysis conditions were the same as those for the simulation analysis shown in FIGS. 3A to 3C and FIG. 4 described above. The analysis results are shown in FIGS. 7A to 7D.

FIGS. 7A to 7D are diagrams to show deformation behavior of a bumper beam of Case 2 in which an inner plate is added. In other words, the top plate section 5 of the first member 2 is disposed facing the outside of the vehicle. The deformation of the bumper beam proceeds in the order shown in FIGS. 7A, 7B, 7C, and 7D. Referring to FIGS. 7A to 7D, when the load P is applied to the top plate section 5 in Case 2, the upper vertical wall section 6a deflects upward of the vehicle, and the lower vertical wall section 6b deflects downward of the vehicle. Therefore, tensile force acts on the inner plate 4 in the vehicle up-and-down direction. In this case, since the inner plate 4 is not likely to deflect, the top plate section 5 and the inner plate 4 are not likely to contact with each other. Therefore, it is difficult to limit the deflection of the load bearing surface by the contact between the inner plate 4 and the load bearing surface as in Case 1. In other words, it is difficult to suppress buckling of the vertical wall section 6 in Case 2.

[Second Embodiment]

The bumper beam of the first embodiment exhibits high energy absorption efficiency since the inner plate suppresses the buckling of the vertical wall section. However, if the buckling of the vertical wall section is suppressed too much extent, when a concentrated load is applied to a center in the lengthwise direction of the bumper beam, cracking may occur in the top plate section of the first member on the rear side before the vertical wall section buckles. Even if the vertical wall section does not buckle, the energy absorption efficiency of the bumper beam will significantly deteriorate, if cracking occurs in the top plate section.

Figure 8:
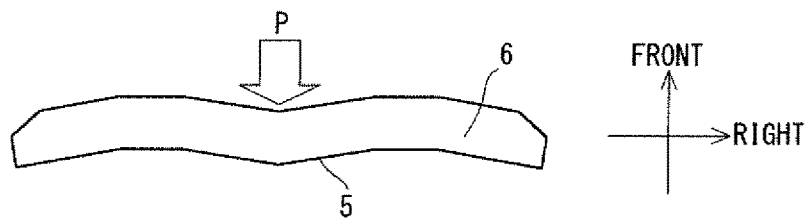
FIG. 8 is a plan view of a bumper beam in which a concentrated load is applied to a center in a lengthwise direction.

FIG. 8 is a plan view of a bumper beam in which a concentrated load is applied to a center in a lengthwise direction. In FIG. 8, the character "right" indicates the right side of the vehicle. The same applies to the following figures. Referring to FIG. 8, when a concentrated load P is applied to the center in the lengthwise direction of the bumper beam, the vicinity of the region to which the concentrated load P is applied deflects toward rearward of the vehicle (direction inward of the vehicle). At this moment, since the top plate section 5 of the first member is disposed on the rear side of the bumper beam, it is subject to force in tensile direction (left-and-right direction of the vehicle). If this force in tensile direction is excessively large, cracking occurs in the top plate section 5. In short, if the buckling of the vertical wall section 6 is suppressed too much extent, cracking occurs in the top plate section 5 before buckling of the vertical wall section 6. In particular, when the material of the bumper beam has high strength and low ductility, cracking is likely to occur in the top plate section 5 such as when the vertical wall section of the first member is long.

Accordingly, in the bumper beam of the second embodiment, to suppress cracking of the top plate section, the position of the inner plate is limited in the lengthwise direction of the bumper beam. Specifically, the present inventors determined suitable position of the inner plate in the lengthwise direction of the bumper beam by means of Example 3 to be described below. This point will be described referring to FIG. 9.

Figure 9:
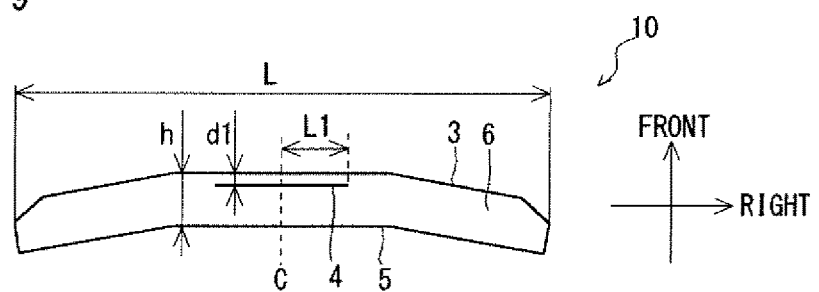
FIG. 9 is a cross sectional view of a bumper beam of a second embodiment seen from above the vehicle.

FIG. 9 is a cross sectional view of a bumper beam of the second embodiment seen from above a vehicle. Referring to FIG. 9, it is considered that the overall length of a bumper beam 10 is L, and arbitrary distance from a center C in the lengthwise direction of the bumper beam 10 is L. The inner plate 4 of the bumper beam 10 of the second embodiment is disposed in a central region at a distance of not less than −L1 and not more than L1 from the center C in the lengthwise direction of the bumper beam 10. Here, the inner plate 4 may be disposed over the entire area of the central region, or in a part of the central region. The distance L1 is preferably 0.2×L, and more preferably 0.1×L. Here, the length L1 is sectioned into positive values and negative values in the vehicle left-and-right direction when the center C in the lengthwise direction of the bumper beam is 0. In short, the inner plate is disposed over a region at a distance L1 away to both sides in the vehicle left-and-right direction from the center C in the lengthwise direction of the bumper beam.

Limiting the region in which the inner plate 4 is disposed to the central region in the lengthwise direction of the bumper beam will make it easier for the end section X of the vertical wall section 6 in a region where no inner plate is disposed, to move toward the center in the vehicle up-and-down direction of the bumper beam (see FIGS. 6A to 6D). As a result, the timing of buckling occurrence of the vertical wall section becomes earlier. Since this causes the vertical wall section to buckle before cracking of the top plate section occurs, it is possible to suppress significant deterioration of energy absorption efficiency due to breakage of the bumper beam.

As described above, when buckling of the vertical wall section 6 of the bumper beam is suppressed too much extent, cracking is more likely to occur in the top plate section 5 when a concentrated load P is applied to the center in the lengthwise direction of the bumper beam. To solve this inconvenience, the plate thickness t2 of the inner plate 4 is preferably not more than the plate thickness t1 of the first member 2. This is for the purpose of optimizing the timing of buckling occurrence in the vertical wall section 6 and suppressing cracking from occurring in the top plate section 5. Specifically, the ratio t2/t1 between the plate thickness t1 of the first member 2 and the plate thickness t2 of the inner plate 4 is preferably not less than 0.7 and not more than 1.0. When the ratio t2/t1 is less than 0.7, the strength of the inner plate 4 is low, and therefore the vertical wall section 6 will have buckled in an early stage. When the ratio t2/t1 is more than 1.0, the strength of the inner plate 4 is high, and therefore cracking is likely to occur in the top plate section 5 when a concentrated load P is applied to the center in the lengthwise direction of the bumper beam. A preferable lower limit of the ratio t2/t1 is 0.8, and a preferable upper limit thereof is 0.9.

In the same manner as described above, to suppress cracking from occurring in the top plate section 5, the tensile strength TS2 of the inner plate 4 is preferably not more than the tensile strength TS1 of the first member 2. Specifically, a ratio TS2/TS1 between the tensile strength TS1 of the first member 2 and the tensile strength TS2 of the inner plate 4 is preferably not less than 0.4 and not more than 1.0. When the ratio TS2/TS1 is less than 0.4, the strength of the inner plate 4 is low, and therefore the vertical wall section 6 will have buckled in an early stage. When the ratio TS2/TS1 is more than 1.0, the strength of the inner plate 4 is high and therefore it is difficult for the end section X of the vertical wall section 6 to move toward the center in the vehicle up-and-down direction of the bumper beam when a concentrated load P is applied to the center in the lengthwise direction of the bumper beam (see FIGS. 6A to 6D). As a result, cracking is likely to occur in the top plate section 5 before the vertical wall section 6 buckles. A preferable lower limit of the ratio TS2/TS1 is 0.6, and a preferable upper limit thereof is 0.8.

Example methods of joining the inner plate 4 with the vertical wall section 6 include welding. Examples of the welding method include spot welding, plug welding, arc welding, and laser welding. However, joining between the inner plate 4 and the vertical wall section 6 is not limited to welding. Joining between the inner plate 4 and the vertical wall section 6 may be performed by mechanical joining.

Examples of the mechanical joining include riveting, bolting and nutting, and screwing. Moreover, joining between the inner plate 4 and the vertical wall section 6 may be performed by an adhesive. The same applies to joining between the first member 2 and the second member 3.

As described above, in the bumper beam of the present embodiment, the second member 3 is disposed facing the outside of the vehicle. For example, as shown in FIG. 9, the bumper beam is curved in the lengthwise direction. In this case, arc of the outer side of the curved bumper beam (on the second member 3 side in FIG. 9) is disposed facing the outside of the vehicle. Moreover, the bumper beam is attached to a crash box which is disposed inside of the vehicle, a front side member, or the like. For that reason, attaching holes, etc. are provided in the surface inward of the vehicle of the bumper beam. In short, even if the bumper beam has not been attached to the vehicle, it is possible to determine which of the first member and the second member of the bumper beam is to be disposed facing the outside of the vehicle.

Figure 10:
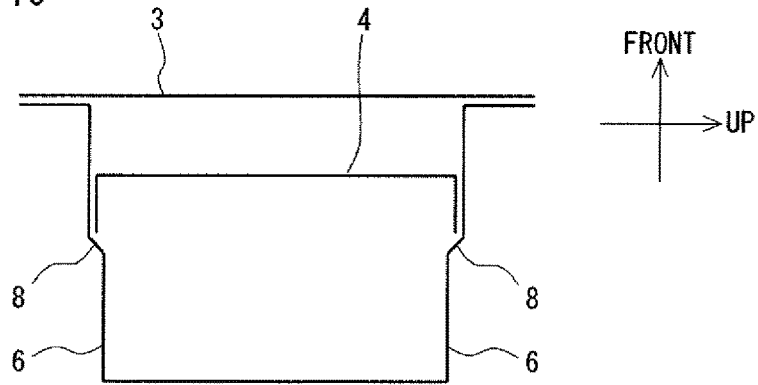
FIG. 10 is a diagram to show an example of joined portion between a vertical wall section and an inner plate.

FIG. 10 is a diagram to show an example of joined portion between a vertical wall section and an inner plate. Referring to FIG. 10, in the present embodiment, a step height 8 for positioning the inner plate 4 may be provided in the vertical wall section 6. As shown in FIG. 10, the size of the step height 8 is about 0.5 mm to several mm. When the step height 8 is less than 0.5 mm, positioning of the inner plate 4 is difficult. When the step height 8 is too large, the rigidity of the vertical wall section 6 changes, and thereby the deformation behavior of the bumper beam will change. In short, the step height 8 of the vertical wall section 6 is provided within a range in which the deformation behavior of the bumper beam will not change. Providing the step height 8 in the vertical wall section 6 facilitates installation of the inner plate and production of the bumper beam.

In the above described embodiment, a case in which the bumper beam is made of a metal plate has been described. Examples of the metal plate include a steel plate, aluminum plate, titanium plate, magnesium plate, copper plate, nickel plate, or an alloy plate thereof, and multi-layer metal plate.

When the bumper beam of the present embodiment is applied to an automobile, it is preferable that the first member and the second member are made of a steel plate having a tensile strength of not less than 1 GPa. In this case, it is possible to further increase the strength of the bumper beam, thereby improving the safety of the vehicle body.

In the above described embodiment, a case in which the bumper beam is provided in the front of the vehicle has been described. In other words, description has been made on a case in which the bumper beam of the present embodiment is applied as a bumper beam of a front bumper of an automobile. However, the bumper beam of the present embodiment will not be limited to the bumper beam of a front bumper. The bumper beam of the present embodiment may be disposed in the rear of the vehicle. In other words, the bumper beam of the present embodiment can be applied to rear bumpers, and the like. In either case, the second member of the bumper beam is disposed facing the outside of the vehicle.

EXAMPLE 1

In Example 1, load application simulation analysis was conducted on the bumper beams in which inner plates 4 were disposed differently to investigate energy absorption efficiency.

Figure 11A:
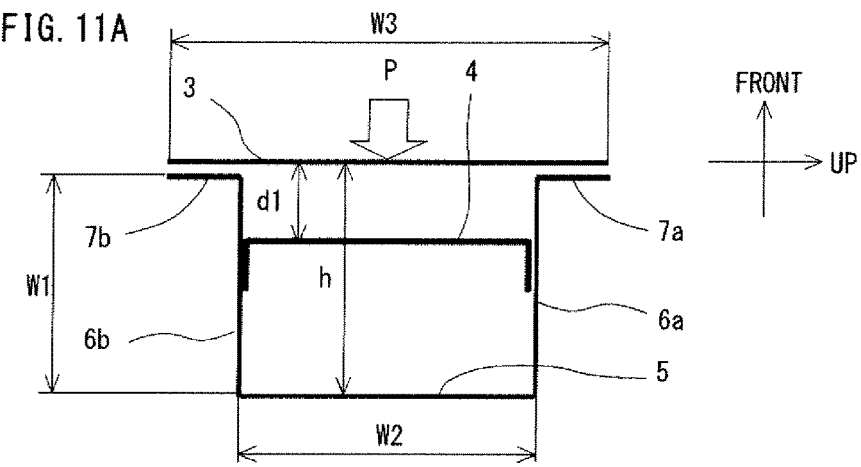
FIG. 11A is a cross sectional view of a bumper beam of Inventive Example of the present invention.
Figure 11B:
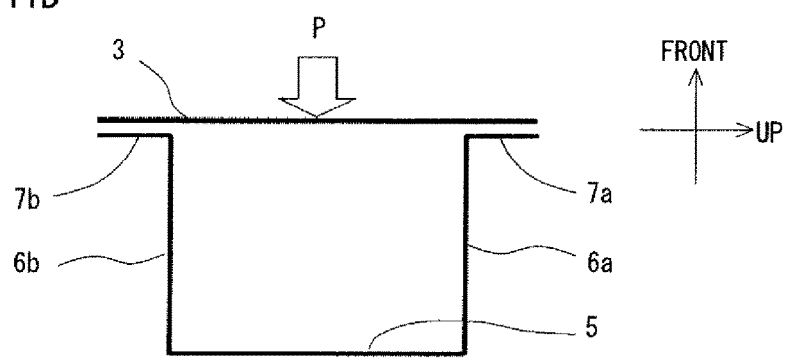
FIG. 11B is a cross sectional view of a bumper beam of Comparative Example 1.
Figure 11C:
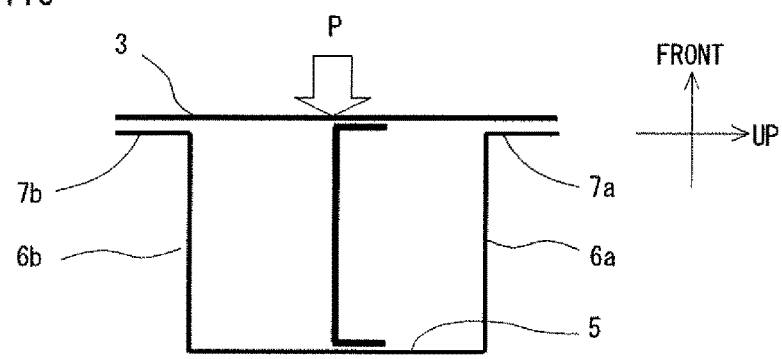
FIG. 11C is a cross sectional view of a bumper beam of Comparative Example 2.

FIGS. 11A to 11C are cross sectional views of analysis models of the bumper beams used in Example 1. FIG. 1A shows a model of Inventive Examples 1 and 2 of the present invention, FIG. 11B shows a model of Comparative Example 1, and FIG. 11C shows a model of Comparative Example 2. The ratio d1/h relating to position of the inner plate 4 of Inventive Example 1 of the present invention was set at 0.16, and the ratio d1/h relating to the position of the inner plate 4 of Inventive Example 2 of the present invention was set at 0.5. In Comparative Example 1, a bumper beam having no inner plate 4 was supposed. In Comparative Example 2, a bumper beam in which the inner plate 4 was disposed perpendicular to the second member 3 was supposed.

Regarding various dimensions of these bumper beams, a width W1 of the vertical wall section 6 of the first member 2 was supposed to be 60 mm, a width W2 of the top plate section 5 was supposed to be 80 mm, and a width W3 of the second member 3 was supposed to be 120 mm. The load P was applied to a center of the second member 3 toward the first member 2. The first member 2, the second member 3, and the inner plate 4 were supposed to be a steel plate having a tensile strength of 1800 MPa, and a plate thickness of 1.4 mm.

Figure 12:
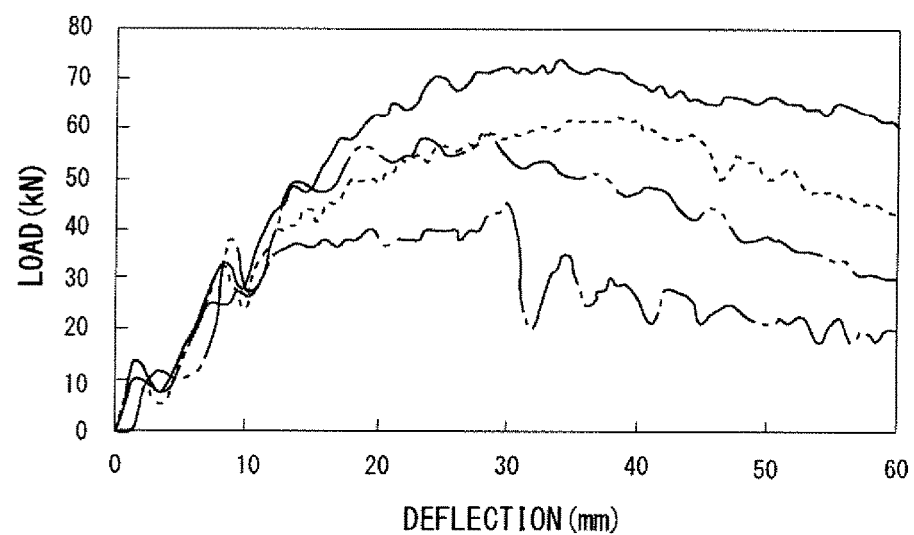
FIG. 12 is a load-deflection diagram of each bumper beam in Example 1.

FIG. 12 is a load-deflection curve relating to each bumper beam of Example 1. In FIG. 12, a solid line indicates the result of Inventive Example 1 of the present invention, broken line indicates that of Inventive Example 2 of the present invention, one-dot chain line indicates that of Comparative Example 1, and a two-dot chain line indicates that of Comparative Example 2. Referring to FIG. 12, in Inventive Examples 1 and 2 of the present invention, the vertical wall section 6 did not buckle until the deflection reached about 38 mm. In Comparative Examples 1 and 2, the vertical wall section 6 buckled before the deflection reached 30 mm. The maximum permissible load was about 73 kN in Inventive Example 1 of the present invention, and was about 62 kN in Inventive Example 2 of the present invention. The maximum permissible load was about 45 kN in Comparative Example 1, and was about 58 kN in Comparative Example 2.

Based on the analysis results of Example 1, the energy absorption efficiency of each bumper beam whose deflection was up to 60 mm was calculated. The results are shown in Table 1.

[Table 1]

TABLE 1

|  | Mass (kg) | Absorbed energy (kJ) | Energy absorption efficiency (kJ/kg) |
| --- | --- | --- | --- |
| Inventive Example 1 of the present invention | 5.0 | 3.4 | 0.68 |
| Inventive Example 2 of the present invention | 5.0 | 2.8 | 0.56 |
| Comparative Example 1 | 3.8 | 1.7 | 0.44 |
| Comparative Example 2 | 4.8 | 2.5 | 0.51 |

The energy absorption efficiency of Inventive Example 1 of the present invention was 0.68 kJ/kg, and that of Inventive Example 2 of the present invention was 0.56 kJ/kg. The energy absorption efficiency of Comparative Example 1 was 0.44 kJ/kg, and that of Comparative Example 2 was 0.51 kJ/kg.

EXAMPLE 2

In Example 2, the maximum permissible load was compared between the bumper beam of Case 1 in which the inner plate 4 was added, and the bumper beam of Case 2 in which the inner plate 4 was added. In Example 2, the result of Inventive Example 2 of the present invention in Example 1 was cited, and as Comparative Example 3 and Comparative Example 4, the inner plate 4 was disposed in the bumper beam of Case 2, and a similar load application simulation analysis as in Example 1 was conducted.

Figure 13:
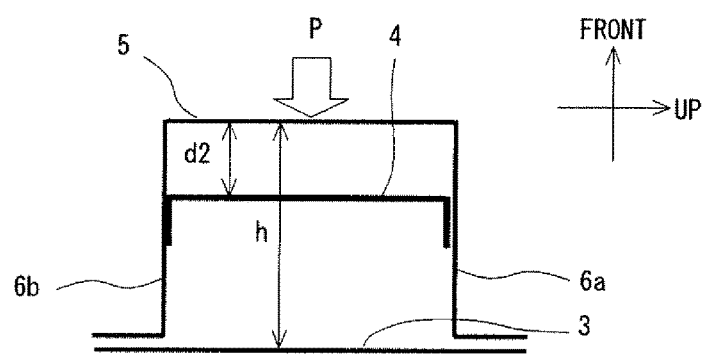
FIG. 13 is a cross sectional view of a bumper beam of Comparative Examples 3 and 4.

FIG. 13 is a cross-sectional view of a bumper beam of Case 2 in which the inner plate 4 used in Case 2 was added. Referring to FIG. 13, a ratio d2/h relating to the position of the inner plate 4 of Comparative Example 3 was supposed to be 0.33, and a ratio d2/h relating to the position of the inner plate 4 of Comparative Example 4 was supposed to be 0.5. The load P was applied to the center of the top plate section 5. Here, d2 indicates an interval between the top plate section 5 and the inner plate 4. In other words, the interval d2 corresponds to a depth from the top plate section 5 to the inner plate 4.

Figure 14:
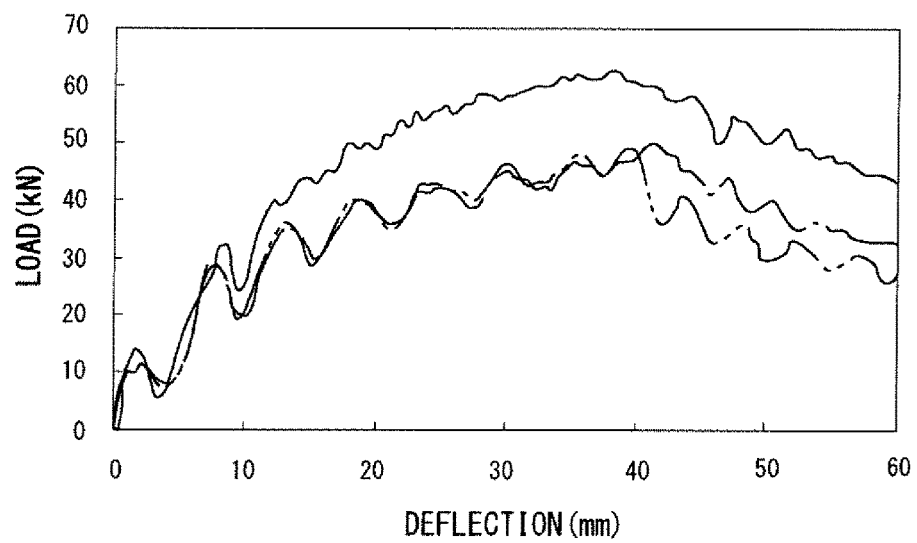
FIG. 14 is a load-deflection diagram of each bumper beam in Example 2.

FIG. 14 is a load-deflection curve relating to each bumper beam of Example 2. For the sake of comparison, the result of Inventive Example 2 of the present invention conducted in Example 1 is shown together in FIG. 14. In FIG. 14, a solid line indicates Inventive Example 2 of the present invention, a one-dot chain line indicates Comparative Example 3, and a two-dot chain line indicates Comparative Example 4. Referring to FIG. 14, both Comparative Examples 3 and 4 exhibited that the vertical wall section 6 buckled when the deflection was more than 40 mm. Moreover, the maximum permissible loads of Comparative Examples 3 and 4 were both about 48 kN.

EXAMPLE 3

In Example 3, a load application simulation analysis was conducted on bumper beams in which a region in which the inner plate 4 was disposed in the lengthwise direction was limited, to investigate occurrence or nonoccurrence of cracking in the top plate section. In Example 3, a width W1 of the vertical wall section 6 of the first member 2 was supposed to be 90 mm, a width W2 of the top plate section 5 was supposed to be 80 mm, and a width W3 of the second member 3 was supposed to be 120 mm. A distance L1 of the bumper beam 10 of the second embodiment shown in FIG. 9 was widely varied to perform simulation analysis similar to that in Example 1.

Figure 15:
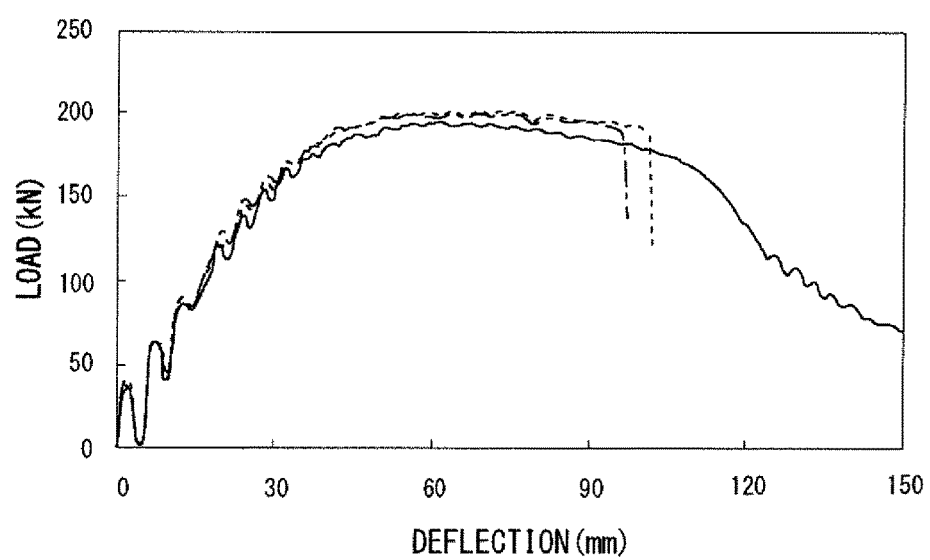
FIG. 15 is a load-deflection diagram of each bumper beam in Example 3.

FIG. 15 is a load-deflection curve relating to each bumper beam of Example 3. In FIG. 15, a solid line indicates the result of a bumper beam in which distance L1 was 0.06×L. A broken line indicates the result of a bumper beam in which distance L1 was 0.2×L. A one-dot chain line indicates the result of a bumper beam in which the distance L1 is 0.5×L.

Referring to FIG. 15, in the bumper beam in which the distance L1 was 0.2×L (solid line), cracking occurred in the top plate section at a deflection of about 100 mm. In the bumper beam in which the distance L1 was 0.5×L (one-dot chain line), cracking occurred in the top plate section at a deflection of about 95 mm.

On the other hand, in the bumper beam in which the distance L1 was 0.06×L (solid line), no cracking occurred in the top plate section.

So far embodiments of the present invention have been described. However, the above described embodiments are merely examples for carrying out the present invention. Therefore, the present invention will not be limited by the above described embodiments, and can be carried out by appropriately modifying the above described embodiments within a range not departing from the spirit thereof.

REFERENCE SIGNS LIST 1, 10, 20 Bumper beam
2 First member
3 Second member
4 Inner plate
41 First inner plate
42 Second inner plate
5 Top plate section
6a, 6b Vertical wall section
7a, 7b Flange section
8 Step height of vertical wall section
d1 Interval between second member and inner plate
d2 Interval between top plate section and inner plate
h Interval between second member and top plate section
L Overall length of bumper beam
P Impact load
X End section of vertical wall section

The invention claimed is:

1. A bumper beam for a vehicle, comprising:
a first member including a top plate section, two vertical wall sections connecting to both side sections of the top plate section, respectively, and two flange sections connecting to the two vertical wall sections, respectively;
a plate-shaped second member which is joined to the two flange sections of the first member and closes a gap between the two flange sections at least; and
an inner plate which is joined to the two vertical wall sections of the first member, and is disposed substantially in parallel with the second member in a space formed by the first member and the second member, wherein
the second member out of the first member and the second member is disposed facing outside of the vehicle.

2. The bumper beam for a vehicle according to claim 1, wherein
a ratio d1/h is not less than 0 and not more than 0.6, where h is an interval between the second member and the top plate section of the first member, and d1 is an interval between the second member and the inner plate.

3. The bumper beam for a vehicle according to claim 1, wherein a ratio d1/h is not less than 0 and not more than 0.2, where h is an interval between the second member and the top plate section of the first member, and d1 is an interval between the second member and the inner plate.

4. The bumper beam for a vehicle according to claim 2, wherein
the inner plate is disposed at least partially in a region at a distance of not less than −0.2×L and not more than 0.2×L from a center in a lengthwise direction of the bumper beam, where L is an overall length of the bumper beam.

5. The bumper beam for a vehicle according to claim 2, wherein
the inner plate is disposed at least partially in a region at a distance of not less than −0.1×L and not more than 0.1×L from a center in a lengthwise direction of the bumper beam, where L is an overall length of the bumper beam.

6. The bumper beam for a vehicle according to claim 1, wherein
the first member and the inner plate are made of a metal plate, and a ratio t2/t1 is not less than 0.7 and not more than 1.0, where t1 is a plate thickness of the first member, and t2 is a plate thickness of the inner plate.

7. The bumper beam for a vehicle according to claim 1, wherein
a ratio TS2/TS1 is not less than 0.4 and not more than 1.0, where TS1 is a tensile strength of the first member, and TS2 is a tensile strength of the inner plate.

8. The bumper beam for a vehicle according to claim 1, wherein
the inner plate and the vertical wall sections are joined by welding.

9. The bumper beam for a vehicle according to claim 1, wherein
the first member and the second member are made of a steel sheet, and a tensile strength of the steel sheet is not less than 1 GPa.

10. A vehicle comprising the bumper beam for a vehicle according to claim 1 at front or rear of the vehicle, wherein the second member of the bumper beam is disposed facing outside of the vehicle.

\* \* \* \* \*